July 21, 1959 G. F. HAUF 2,895,531
ROLLER SHAFT BEARING FOR COLD ROLL FORMING MACHINE
Filed May 10, 1956 14 Sheets-Sheet 3
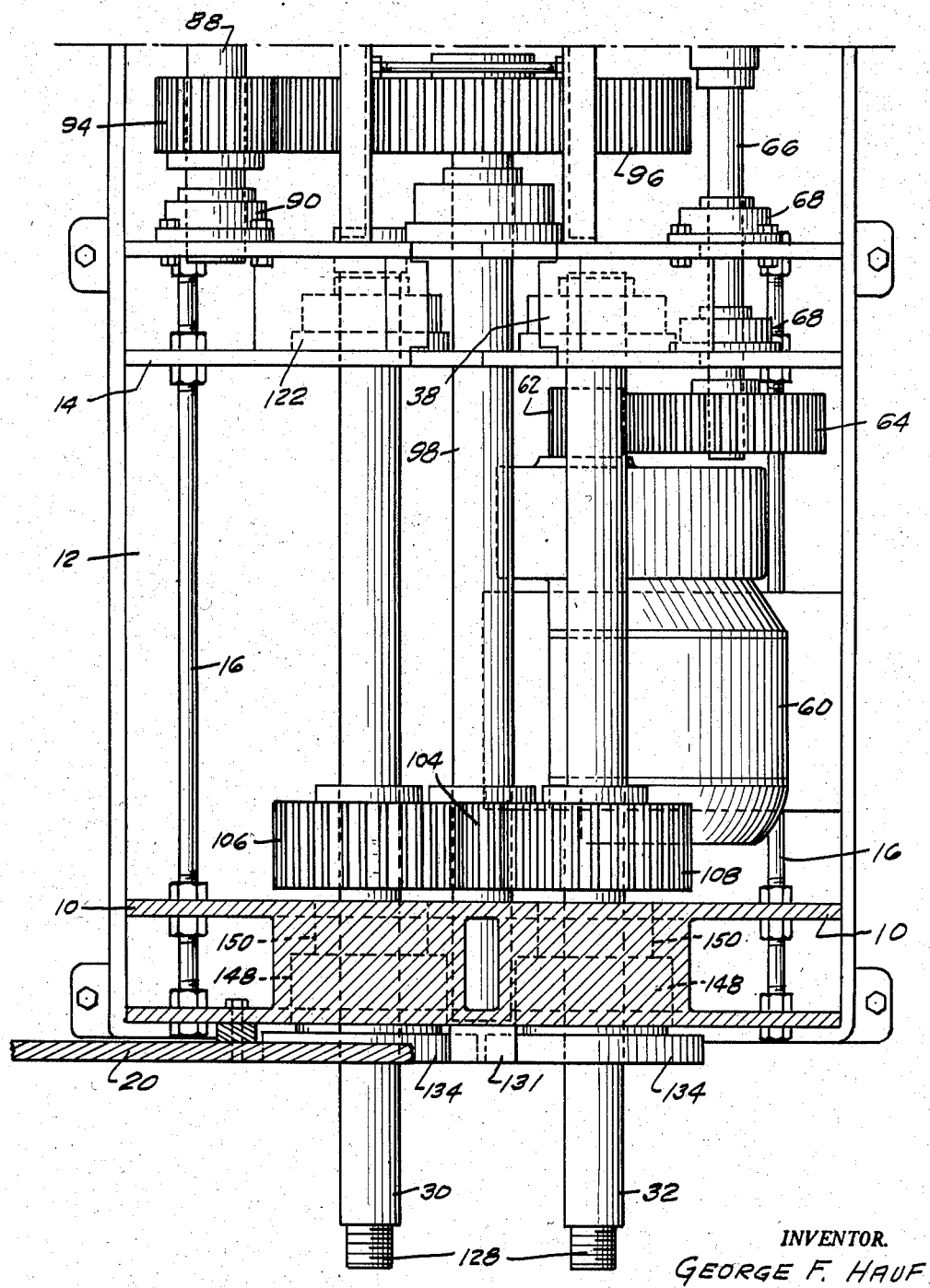
FIG. 2-A.
INVENTOR.
GEORGE F. HAUF
BY
Harry H. Hitzeman
ATTORNEY.

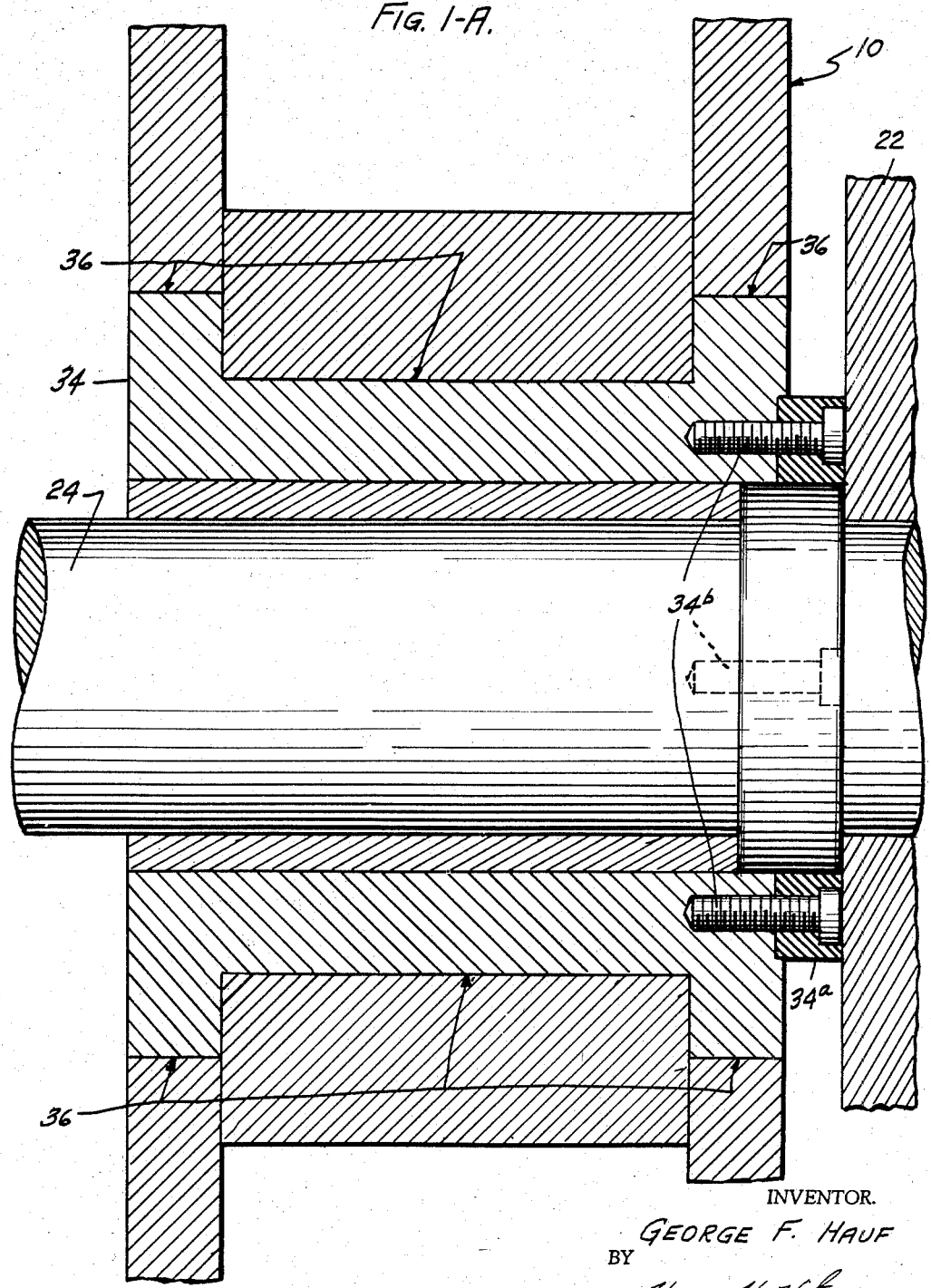

July 21, 1959 G. F. HAUF 2,895,531
ROLLER SHAFT BEARING FOR COLD ROLL FORMING MACHINE
Filed May 10, 1956 14 Sheets-Sheet 4
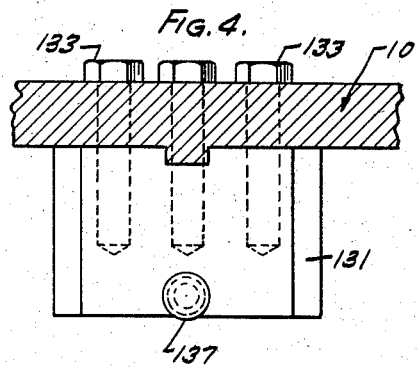
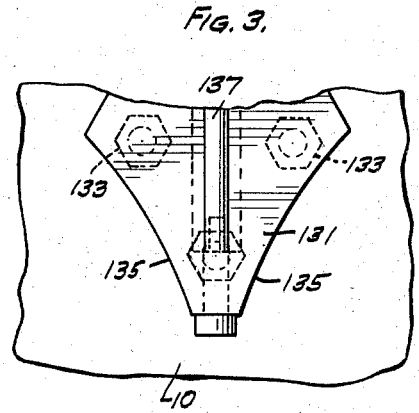
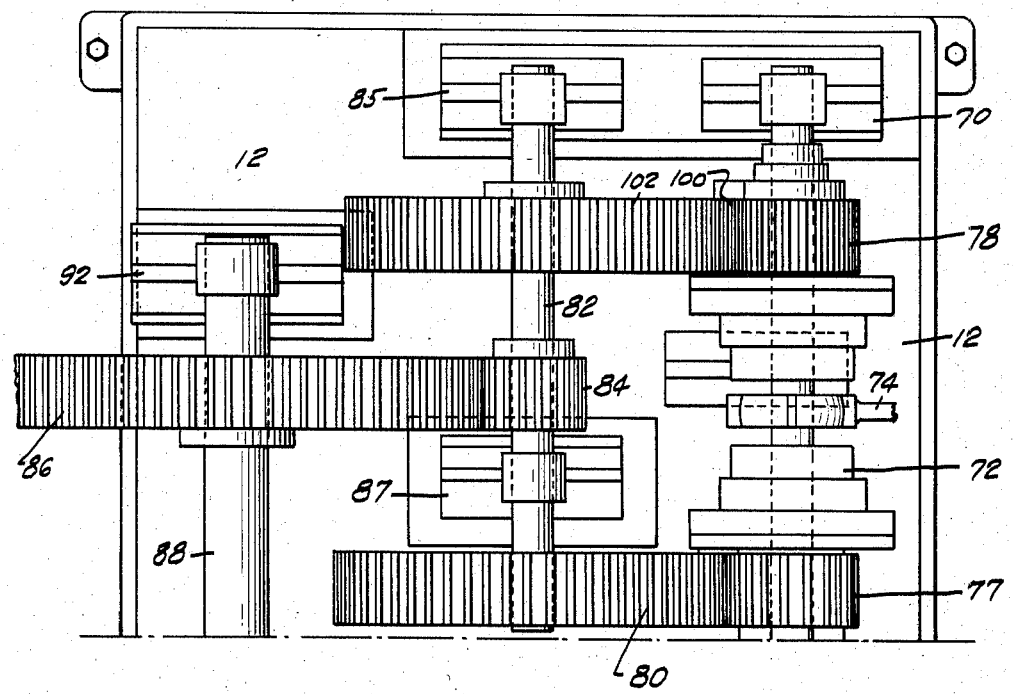
Fig. 2-B.
INVENTOR.
GEORGE F. HAUF
BY
Harry H. Hitzeman
ATTORNEY

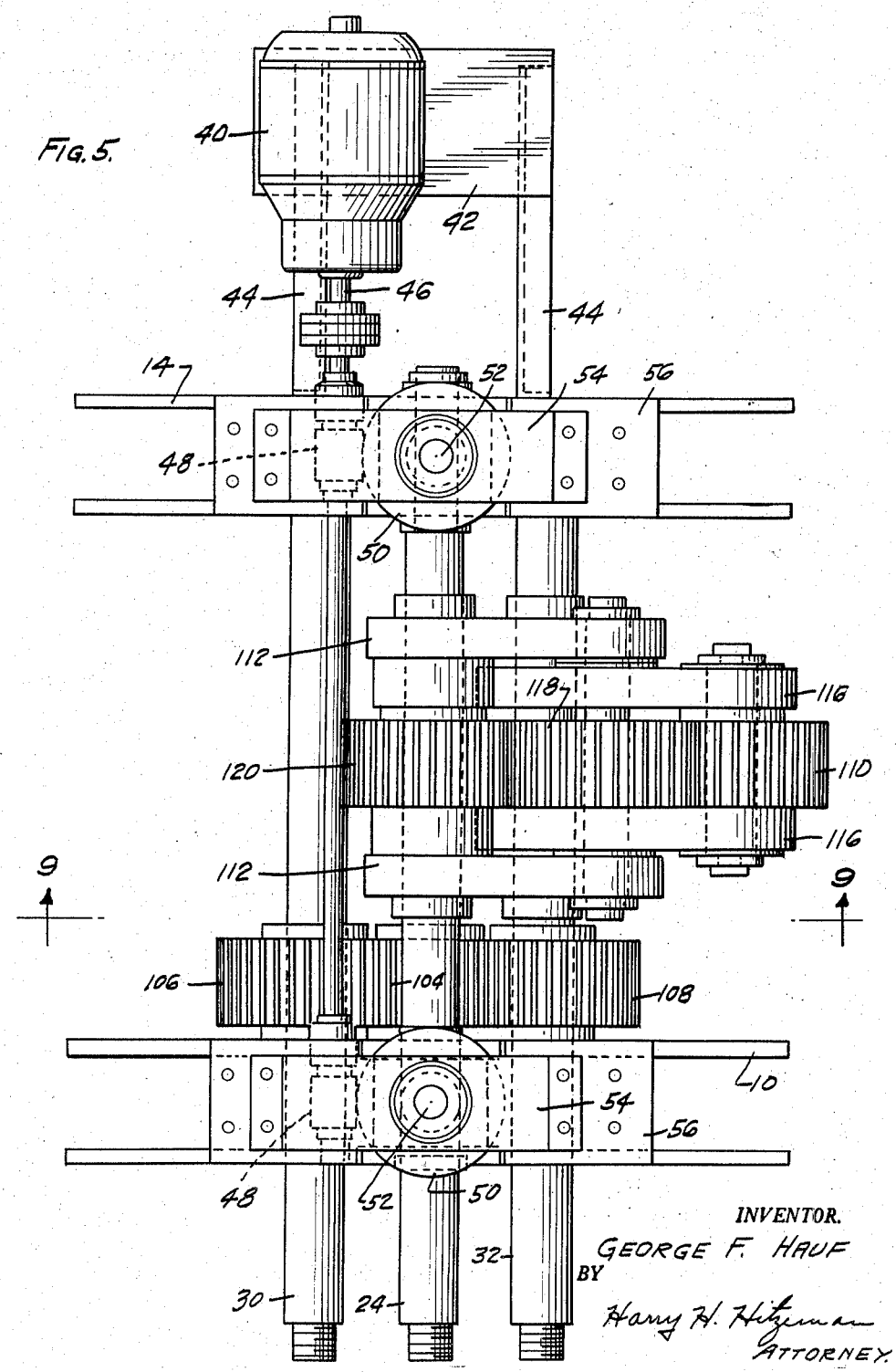

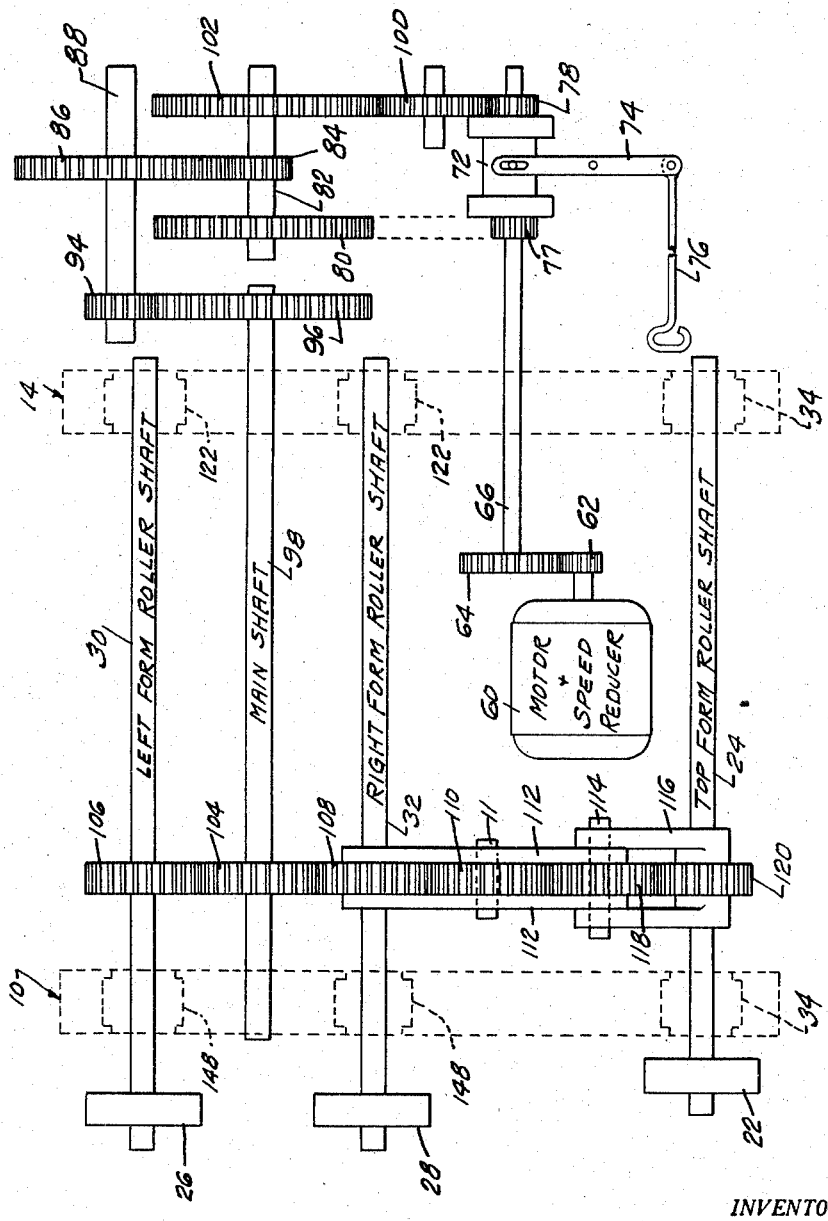

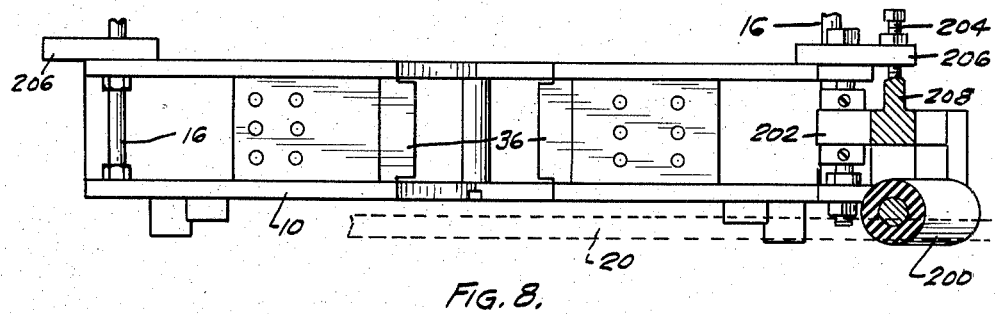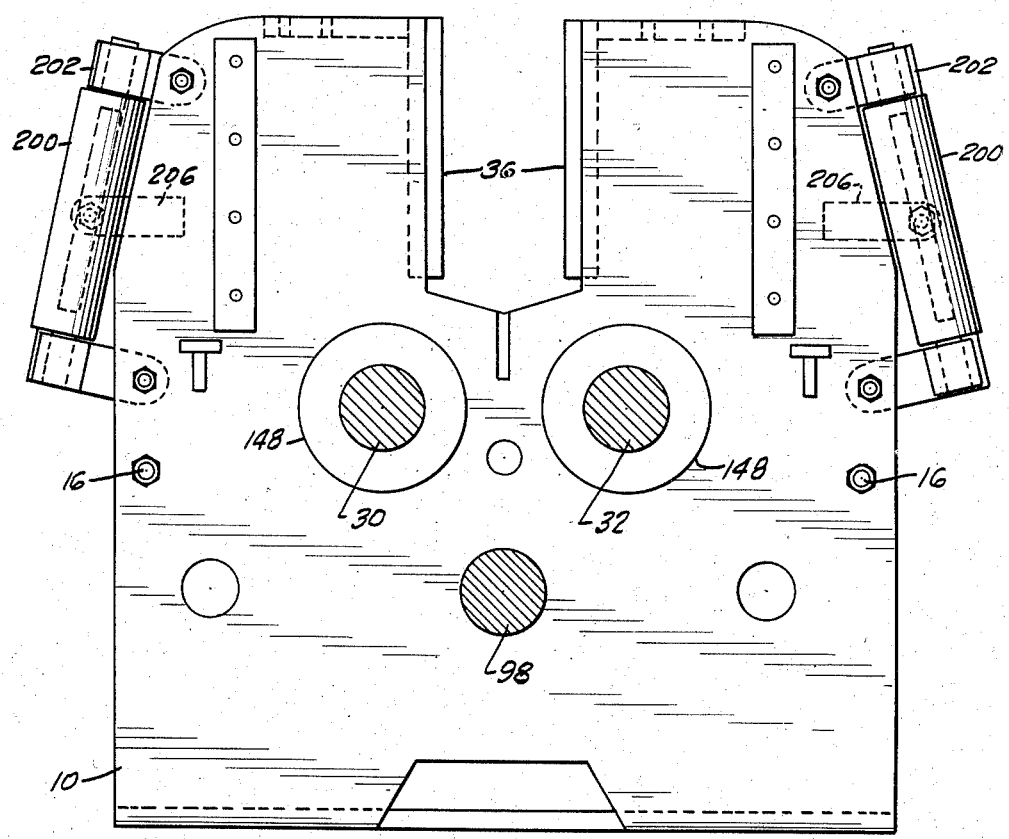

July 21, 1959 G. F. HAUF 2,895,531
ROLLER SHAFT BEARING FOR COLD ROLL FORMING MACHINE
Filed May 10, 1956 14 Sheets-Sheet 8

INVENTOR.
GEORGE F. HAUF
BY
Harry H. Hitzeman
ATTORNEY.

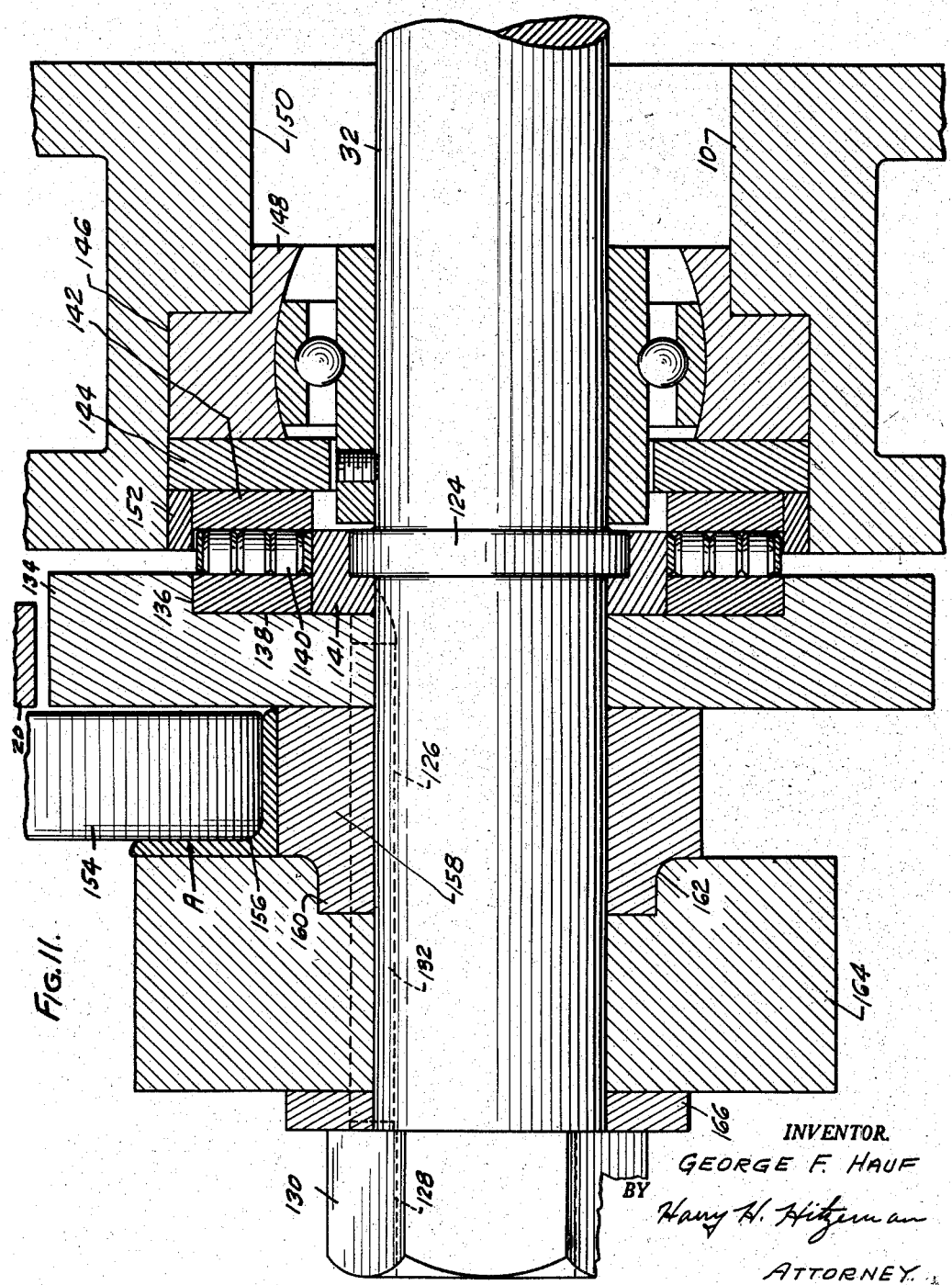

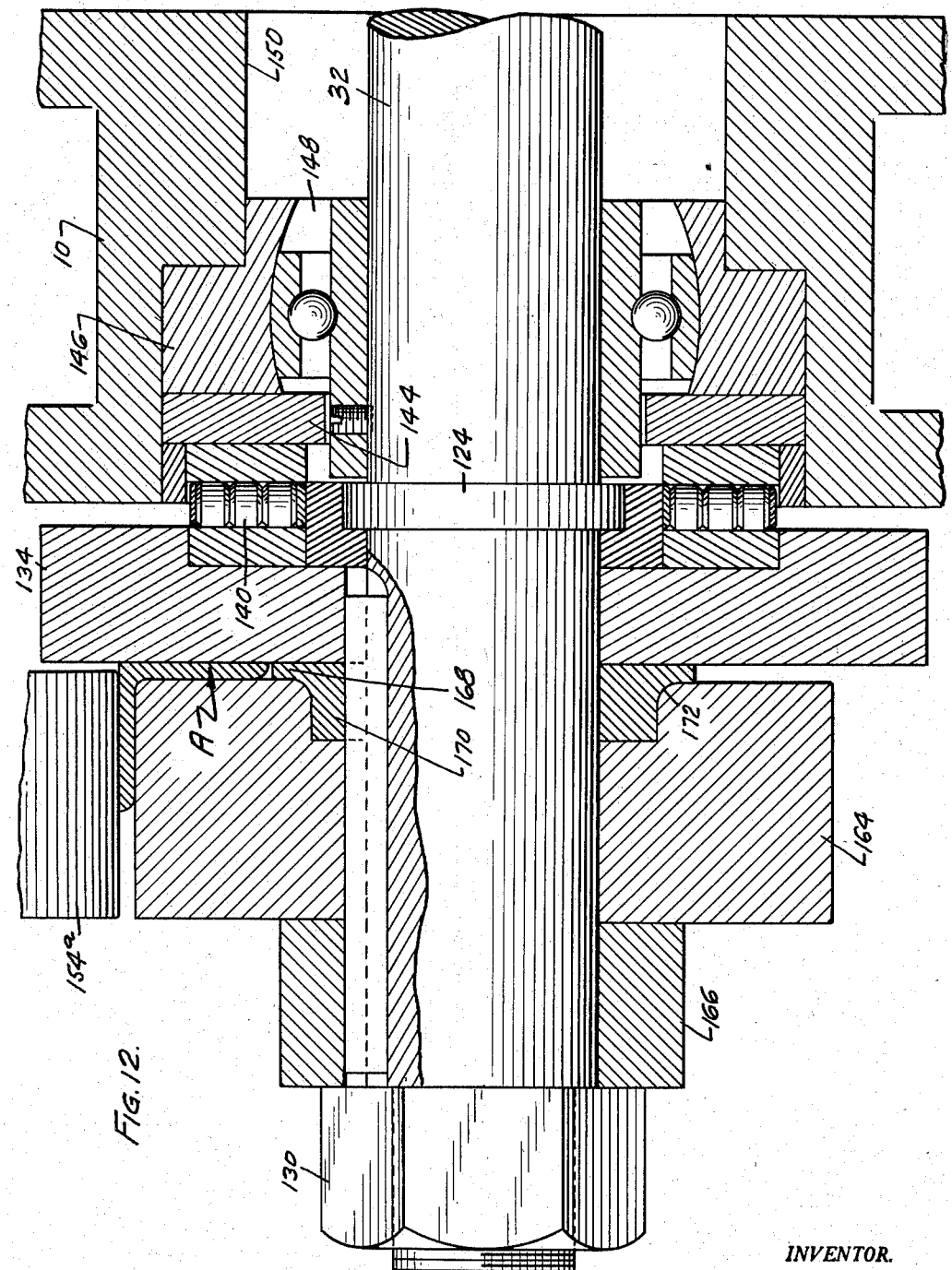

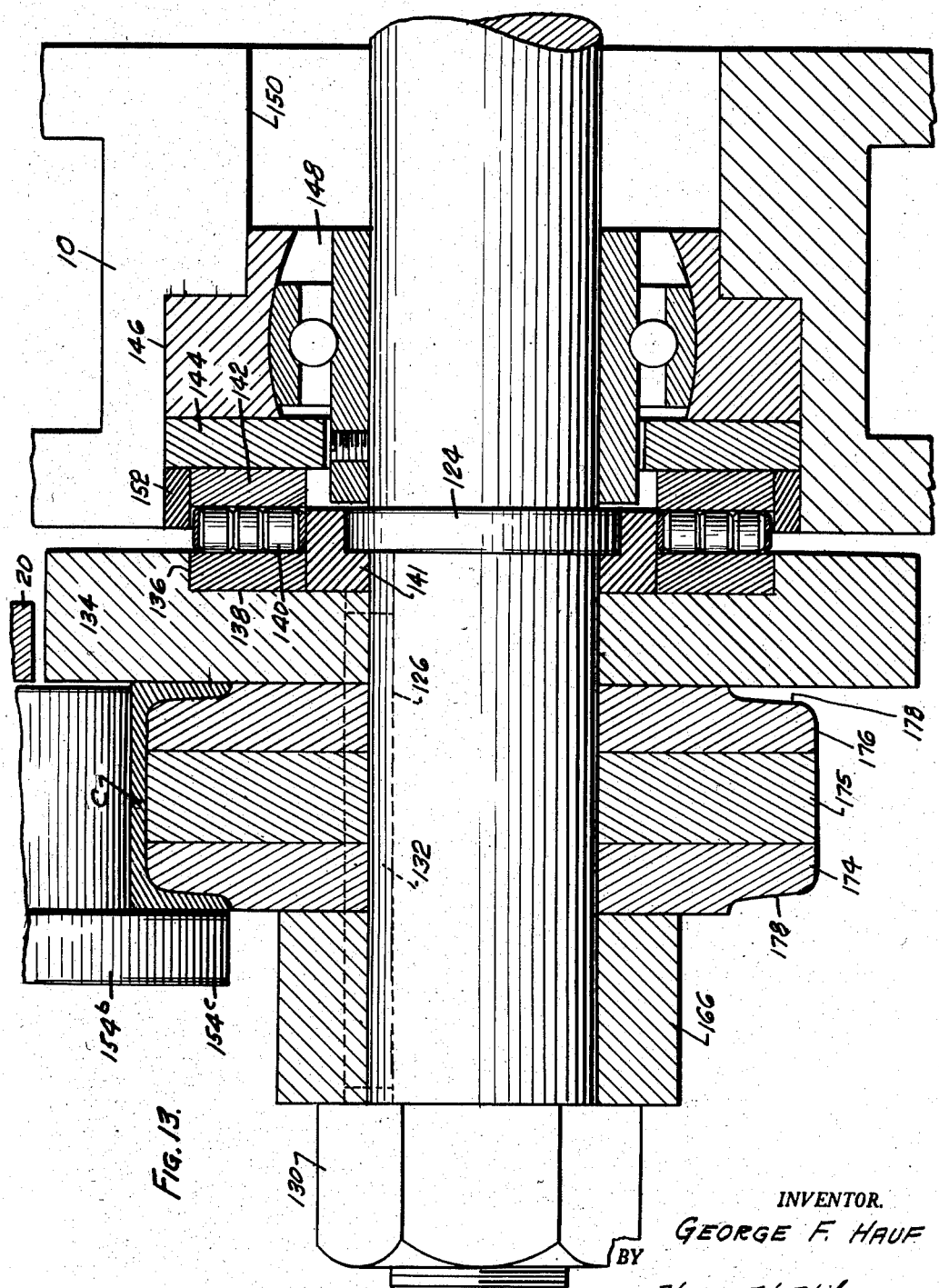

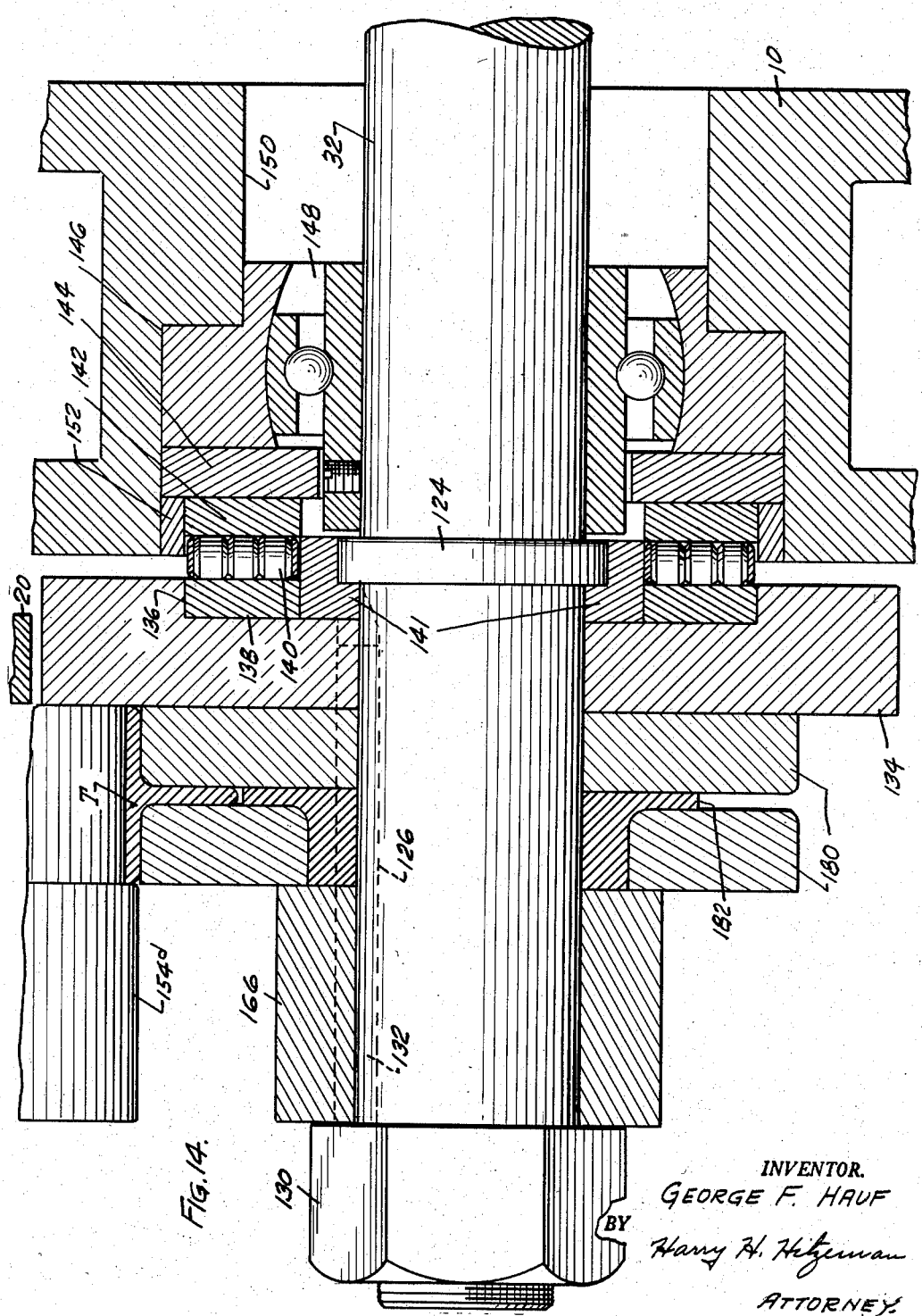

July 21, 1959 G. F. HAUF 2,895,531
ROLLER SHAFT BEARING FOR COLD ROLL FORMING MACHINE
Filed May 10, 1956 14 Sheets-Sheet 13

INVENTOR.
GEORGE F. HAUF
BY
Harry N. Hitzeman
ATTORNEY

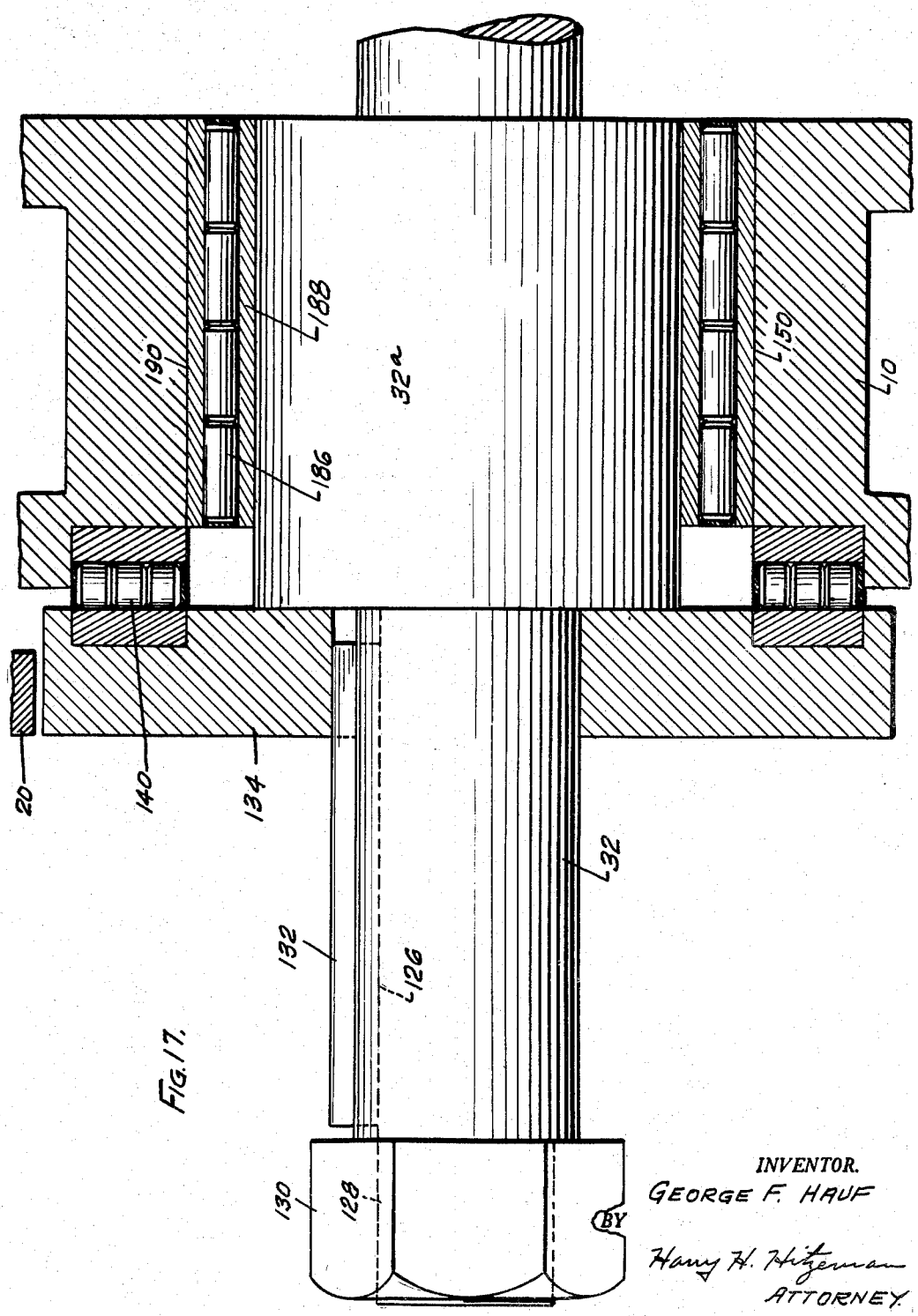

United States Patent Office 2,895,531
Patented July 21, 1959

2,895,531

ROLLER SHAFT BEARING FOR COLD ROLL FORMING MACHINE

George F. Hauf, River Forest, Ill., assignor to Chicago Metal Mfg. Co., Chicago, Ill., a corporation of Illinois Application May 10, 1956, Serial No. 584,066

3 Claims. (Cl. 153—65)

My invention relates to cold roll ring forming machinery and similar apparatus.

My invention relates more particularly to machinery of the type described which is capable of forming rings or coils from a plurality of different kinds of cold roll metallic structures, such as bars, rods, angles, T's, I-beams, and other similar structures.

Machinery of the type described is well known in the art and includes the structure shown in the previous George F. Hauf Patent No. 1,915,312, which was issued on June 27, 1933. There are, however, certain defects in the structure of the machines of the prior art which the present invention overcomes. In forming rings or ovals from the various metallic structures mentioned, it is extremely important that the entire surface of the shape to be bent is rigidly supported, otherwise the metal that is being bent will become deformed or out of shape at the surfaces that are not supported. Further, except for such support, especially in bending angle irons, there is a tendency of the metal to get out of square, and reduce or enlarge the 90° angle between the two legs of the structural member.

The principal object of the present invention is to provide a ring forming machine which is so constructed that in the bending of any metallic member of the type described there will be substantial and fixed support throughout the entire surface of the member to be bent.

A further object of the present invention is to provide die rolls for ring forming machines of the type described so constructed that they will furnish support to the structural member being bent throughout its entire surface.

A further object of the invention is to provide proper support bearings for the die rolls of the ring forming machine and the shafts upon which they are mounted, the bearings being so arranged that they form in effect a combined thrust and radial bearing for both the shaft and the die rolls, the radial bearings being disposed adjacent the periphery of the die rolls so that they will directly support the die rolls at the point where the metal forming is taking place.

Another object of the invention is to provide in combination with the roller shaft and rolls, a method of supporting interchangeable die roller sections upon the roller shafts in such a way that each individual part of the built-up die roller is securely attached to the shaft and to the other parts of the die roller so that the same will act in operation as an integral unit.

Another object of the invention is to provide an improved drive assembly for the top and forming rollers which may include a continuously operating direct drive motor and clutch means capable of operation from the front of the machine so that the rollers may be "inched" forward or back as desired by the simple manipulation of the clutch, the motor being in continuous operation during such action.

A further object of the invention is to provide in combination with a machine of the type described improved guide rollers associated with the back plate against which the metallic member is formed into a ring, the rollers being capable of adjustment so that a more nearly perfect ring or circle may be formed.

Other objects and advantages will be more apparent from the following description wherein reference is had to the accompanying drawings, upon which:

Fig. 1 is a front elevational view of a ring forming machine embodying my invention;

Fig. 1-A is a horizontal fragmentary cross-sectional view through one of the reciprocally movable bearing blocks, taken generally on the line 1A—1A of Fig. 1;

Fig. 2-A is a horizontal sectional view taken generally below the top forming roller and showing the drive mechanism for the left and right lower forming rollers;

Fig. 2-B is a horizontal sectional view of a continuation of the machine showing the back portion thereof, the figures being separated on the dot-dash line shown at one edge of both views;

Fig. 3 is an enlarged fragmentary elevational view of the filler block which is mounted between the forming rollers;

Fig. 4 is a plan sectional view through the back plate with the filler block in plan;

Fig. 5 is a fragmentary plan view showing the drive for raising and lowering the top die roller, and also showing the drive for the same;

Fig. 6 is a schematic view showing the complete drive for the top and the right and left forming rollers;

Fig. 7 is a fragmentary front elevational view of the front housing or frame showing the mounting of the guide rollers on the sides of the frame and the forming roller shafts in section;

Fig. 8 is a plan view of the front frame or housing and showing one of the guide rollers in horizontal section;

Fig. 11 is a fragmentary cross-sectional view about actual size, through the lower right forming roller showing the combined radial and thrust bearing construction for supporting the shaft and die rollers mounted thereon, the view illustrating the manner in which the die rollers are assembled for forming "leg-in" angle members into circles or rings;

Fig. 12 is a similar sectional view showing the manner in which the die rollers are assembled and mounted for forming a "leg-out" ring or circle from an angle member;

Fig. 13 is a similar cross-sectional view showing the manner in which the forming rollers are assembled and mounted for forming a "leg-out" channel;

Fig. 14 is a similar cross-sectional view showing the manner in which the die rollers are assembled and mounted for forming a "leg-out" T member into a circle;

Fig. 17 is a fragmentary cross-sectional view about actual size through one of the forming rollers showing a modified form of combined radial and thrust bearing embodying an enlarged shoulder on the roller shaft.

Figure 1:
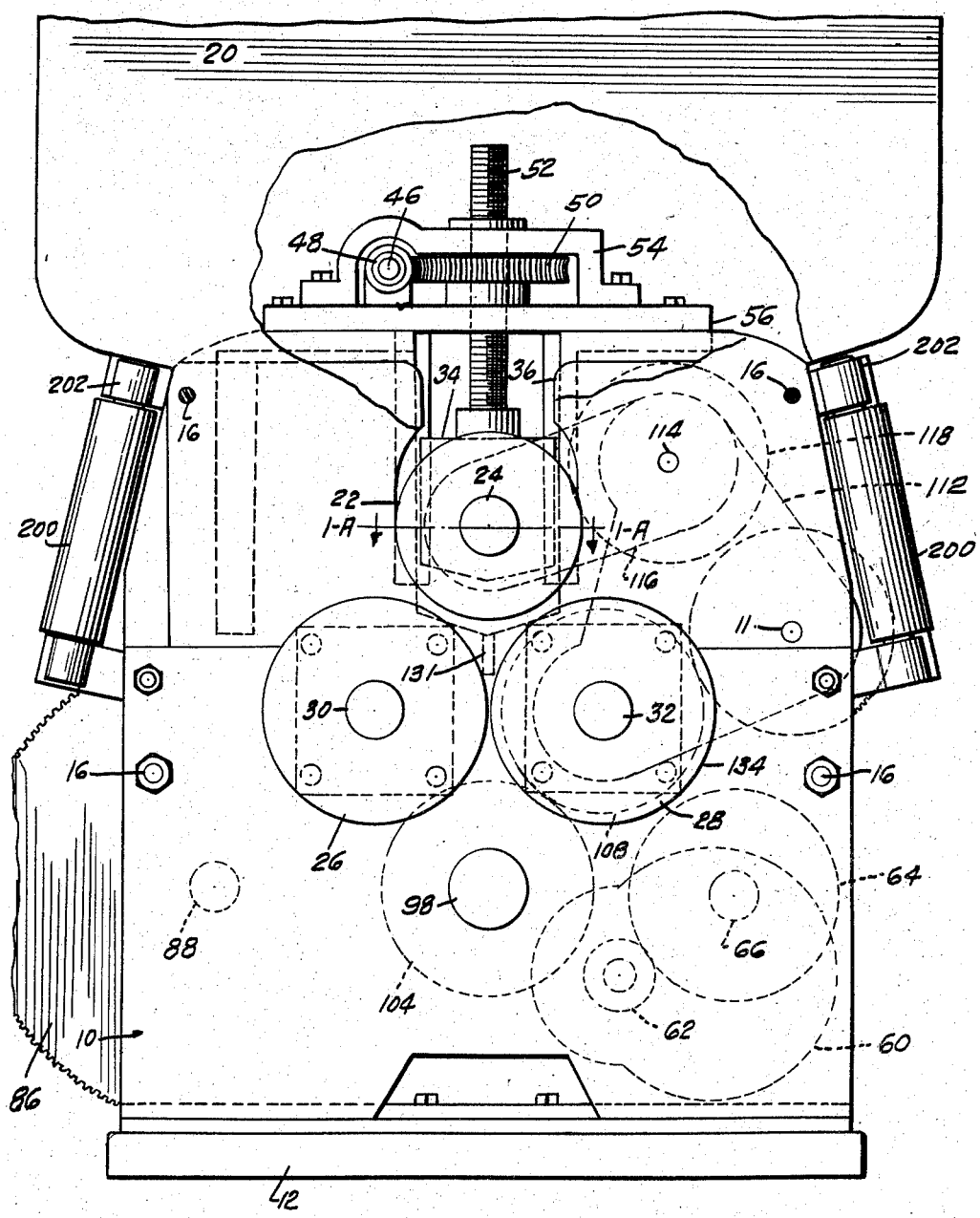
Figures 9, 10:
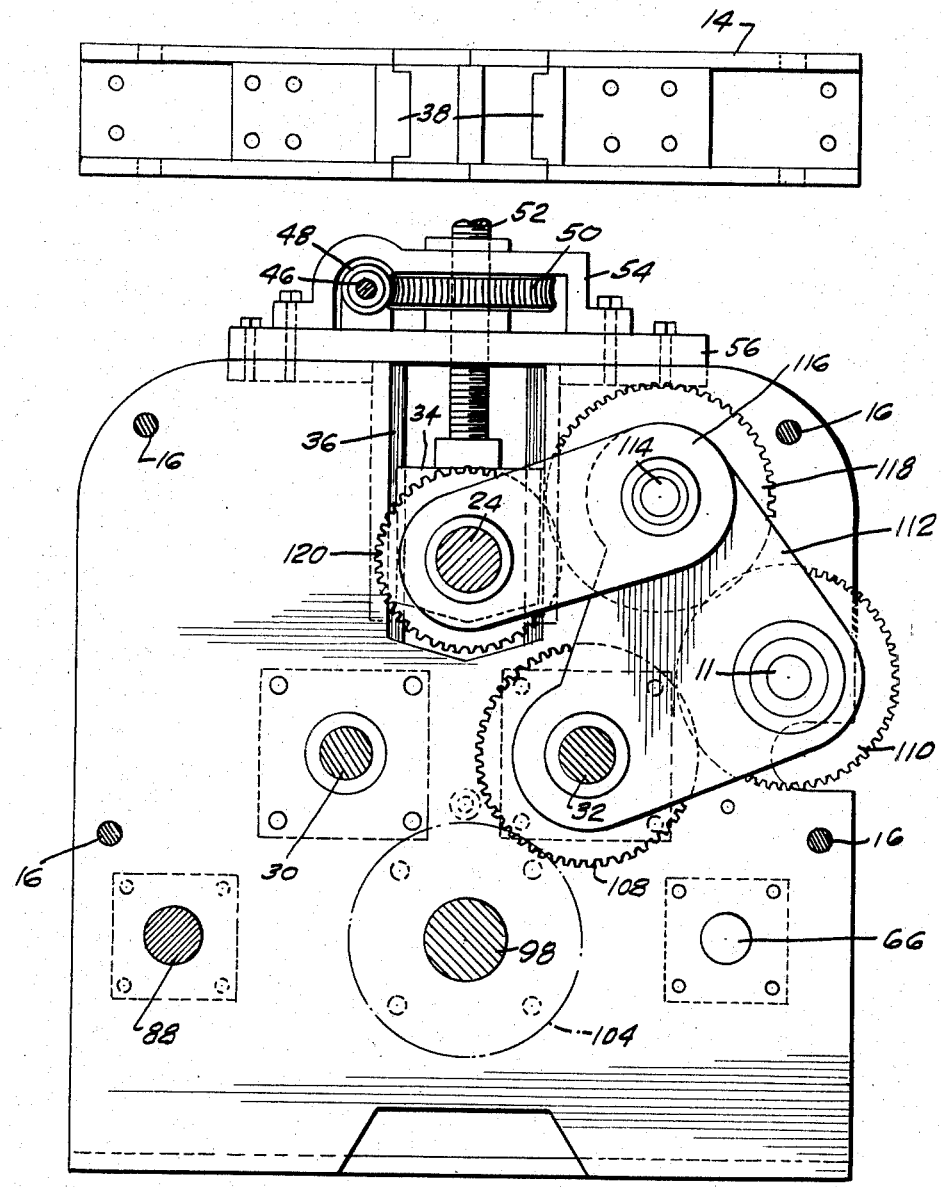
Fig. 9 is a vertical sectional view taken generally on the line 9—9 of Fig. 5 showing portions of the drive for the various forming rollers and the mechanism for raising or lowering the top shaft and roller.
Fig. 10 is a plan view of the back frame or housing shown in Fig. 9.

In the embodiment of the invention which I have chosen to illustrate and describe the same, in Fig. 1 I have shown the front frame or housing 10 which is mounted upon the horizontal base 12. A similar back frame or housing 14 is also mounted upon the base 12, the front and back housings being securely connected together by the four bolt members 16. A backing plate 20 of any suitable size is fastened closely against the forward wall of the front housing 10.

The forming rollers which I employ may comprise an upper die roller 22 mounted on the horizontal shaft 24, and left and right die rollers 26 and 28 mounted on the drive shafts 30 and 32 respectively.

In order to form rings on various diameters, it is necessary to raise or lower the top forming rollers the desired distance. A flat spacer 34a held in position by set screws 34b may be fastened to the front of bearing 34 against the upper die roller 22. For this purpose the shaft 24 is mounted in a pair of multiple shaft bearings 34, one bearing mounted in a suitable guide 36 in the front housing 10 and the other mounted in a similar guide 38 in the back housing 14.

Means for raising or lowering the bearings 34 and the shaft 24 may comprise a motor 40 (see Fig. 5) mounted upon a platform 42 that is supported back of the back housing 14 on a pair of brackets 44. The motor 40 has a shaft 46 which is provided with a pair of worms 48 that engage a pair of worm wheels 50. The worm wheels 50 are mounted for rotation upon the vertical threaded shafts 52 which are fixedly connected to the upper end of the top roller shaft bearing 34 so that when the motor 40 is driven in either direction the top shaft 24 will be raised or lowered in its two support bearings in the front and back housing members.

The shaft 46 and worm wheel 50 are mounted in suitable bearing members 54 positioned on support plates 56 on top of the front and back housing members 10 and 14.

The drive mechanism which I provide may include a combined motor and speed reducer 60 which is mounted on the base 12, the shaft of which carries a spur gear 62 that drives a face gear 64 mounted on shaft 66. Shaft 66 is supported by suitable bearings 68 mounted on the back housing 14 and a pedestal bearing 70 mounted on the base 12. The shaft 66 has a reversing clutch 72 mounted thereon, the clutch being operated by a pivoted lever 74 connected to an operating handle 76. The operating handle 76 extends to the forward end of the machine adjacent the front housing 12. The clutch 72 is adapted to engage the shaft 66 with either the pinion 77 or the pinion 78.

The pinion 77 drives a face gear 80 which is mounted on the stub shaft 82 supported in pedestal bearings 85 and 87 mounted on the base 12 of the machine. The shaft 82 also carries a pinion gear 84 which drives a face gear 86 mounted on a stub shaft 88 supported by a bearing 90 on the back housing 14 and a pedestal bearing 92 on the base 12. The shaft 88 has a pinion 94 keyed thereto, the pinion 94 being in driving engagement with a face gear 96 mounted on the main drive shaft 98. With this train of gears a drive in one direction is obtained from the motor 60 to the main drive shaft 98.

For a reverse drive, the pinion 78 engages an idler gear 100 which drives the face gear 102 on the shaft 82. Through gears 84, 86, 94 and 96, a drive is thus obtained. The main drive shaft 98 has a face gear 104 connected thereto adjacent the front housing 10 of the machine, the face gear 104 engaging similar face gears 106 and 108. The face gear 106 is mounted on the lower left roller shaft 30 and the face gear 108 is mounted on the lower right roller shaft 32. The gear 108 engages a similar face gear 110 mounted on a stub shaft 11 carried by a pair of support arms 112. The support arms 112 also carry a shaft 114 mounted in a pair of movable arms 116 which are rotatably connected on the top roller drive shaft 24.

An idler face gear 118 is mounted on the shaft 114 and drives a face gear 120 keyed to the top roller shaft 24. With the chain of face gears 104, 106, 108, 110, 112, 118 and 120, the three former roll shafts are thus all driven in the same direction of rotation and the drive for the top shaft is accomplished in any raised or lowered position of the same.

From the foregoing description it can thus be seen that the operator of the machine, by merely manipulating the handle 76, can "inch" the structural member back and forth in the forming rollers as desired. This direct drive and the use of a reversing clutch speeds up the operation of the machine considerably.

Each of the lower forming roller shafts is mounted in a suitable bearing member 122 connected to the vertical wall of the back housing 14 and is supported in the front housing 10 in the type of bearing shown in Figs. 11 to 15 respectively. The upper central roller shaft 24 is carried in similar bearing mountings in each of the bearing blocks 34 previously described.

Each of the shafts 24, 30 and 32 has a collar 124 formed integral therewith and a keyway 126 extending forward from the collar 124 to a reduced threaded portion 128 on the end of the shaft and upon which a roller fastening nut 130 is screw-threadedly mounted. A key 132 is mounted in the keyway 126 so that all of the parts of the various die rolls for different types of structural units and the spacers are all keyed directly to the shaft.

Each of the three forming rollers has a backing roller 134 mounted thereon, the forward edge of which is flush with the front plate 20. Each of the backing rollers is formed with a circular chamber 136 to receive the ring 138 of a roller bearing 140. The roller bearing is preferably mounted on a spacer collar 141 that has a forwardly extending flange enveloping the collar 124 on the shaft. The other ring 142 of the roller bearing unit is positioned against a backing ring 144 mounted in the circular bore 146 in the front housing 10. A ball bearing assembly 148 is held in position in the bore 146 and a concentric bore 150 of the housing 10 by the backing ring 144. A filler ring 152 embraces the outer periphery of the roller bearing unit 140.

With this assembly of roller bearing and ball bearing mounting closely adjacent the backing roller of the die rolls of the machine, the direct thrust of the pinching action which takes place when the metal is being bent from a straight line into a circle is thus absorbed almost directly behind and in alignment with the location where the working of the metal is taking place. With this construction there is no tendency for the shaft of either the top or the lower forming rolls to flex, as happens in machines that have been built in the past. Because there is no flexing of the shaft, the metal will be formed more accurately, and because the burden of the forming is directly against suitable roller and ball bearings, the operation is more easily and accurately accomplished.

In Fig. 11 die rollers of the type that are used for bending an angle A into a "leg-out" circle have been shown. The upper die roller 154, which consists generally of a cylindrical plate with the rounded corner 156 to concide with the radius of the angle member, is mounted on the upper shaft 24 adjacent the front plate 20. Each of the lower shafts 30 and 32 carry a spacer 158 that is the width of the angle to be rolled. Each spacer is formed with a key slot to engage the key 132 and also formed with a collar portion 160 which extends into a suitable chamber 162 in the back side of the forming roller 164 that is mounted on the shaft, the forming roller 164 being of sufficient diameter to provide a backing throughout the entire length of the leg of the angle member A during the forming operation. The roller 164 is fastened on the shaft by the nut 130 previously described and a washer 166 of the required thickness.

In connection with the lower backing rolls 134 and in order to assure a direct and easy start of the bending of the various structural members, I mount a filler block 131 on the face of the front housing 10, the same being held in place by bolt members 133 which extend through the front wall of the housing 10. The filler block, as shown, has a pair of arcuate side walls 135 which conform to the backing roll 134, and also has a vertically disposed roller 137 mounted medially thereof to assist in guiding the back edge of the structural member in a straight line between the forming dies.

In building up a die roller for forming the angle A into a "leg-in" circle, a spacer 168 which has a collar portion the thickness of the leg of the angle is mounted on the shaft 32, the spacer having the collar 170 extending into a suitable chamber 172 in the forming roller 164. A spacer collar or washer 166 of desired width is then placed on the shaft and the die rollers are fastened in place by the nut member 130. The upper shaft 24 carries the forming roller 154a of a size to leave sufficient space between the same and the roller 164 to encompass the extended leg A of the angle. With this set-up of die rollers, it can again be seen that practically the entire surface of the structural member being bent is guided and directed in forming die rollers which confine the same in the same way that a press brake would confine the structure.

In Fig. 13 I have shown the make-up of the forming die rollers for working a channel member into a "leg-out" circle. This structure may include the two forming die rollers 174 and 176 having their peripheral edges 178 shaped to conform to the legs of the channel C. The die rollers are separated to the exact distance required by a spacer 175 and the assembly is held on the end of the shaft by a spacer collar 166 confined by the nut 130. The upper die roller 154b is fastened on the upper shaft 24, the die roller having a circumference to leave sufficient space between the peripheral edge of the die rollers 174 and 176 for the thickness of the web of the channel, and also having a circular flange 154c extending down along the leg of the channel to a point near its end.

In Fig. 14 I have shown the make-up of the die rollers for forming a T-member with a "leg-out" flange. In the make-up of this die roller, I provide a pair of rollers 180 separated on the end of the shaft by a spacer 182, the spacer being the width of the web of the T-member. The die roller 154d mounted on the upper shaft 24 is formed similar to the die roller 154b, having a peripheral flange which extends beyond the edge of the web of the T-member.

Figure 15:
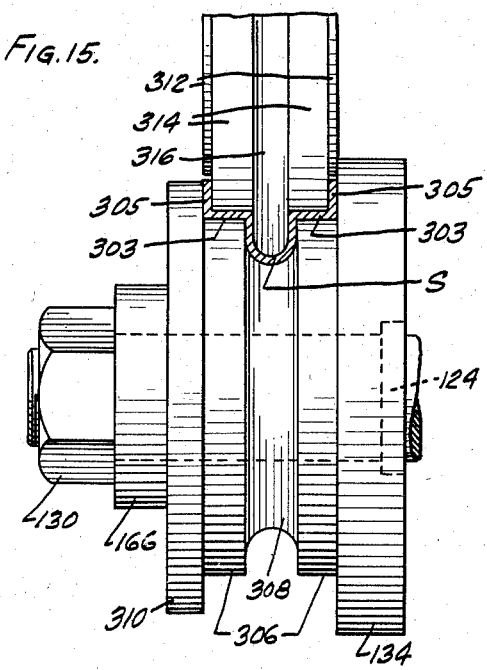
Fig. 15 is a similar cross-sectional view through one of the forming rollers and showing a portion of the top roller, in which the die rollers are assembled and mounted for forming a circle from an irregularly shaped metal strip.

In Fig. 15 die rollers of the type that may be used for bending a pre-formed metal strip into a circle have been shown. The strip S may have a central ridge portion 301, a pair of parallel side flanges 303, and upturned edges 305. Each of the lower die rollers may include the backing roller 134 and a built-up die roller consisting of circular discs 306 and a disc 308 having an arcuate groove positioned therebetween. A facing disc 310 is placed on the front of the same between the spacer 166 and the fastening nut 130.

The disc 310 is of sufficient diameter to extend to the upper end of the edges 305 of the strip. The upper roll is formed with a spacer 312 adjacent the upper backing roll 134 and a pair of die rollers 314 upon both sides of a middle die roller 316 that has an arcuate edge to conform to the groove in the strip S. In this manner the die rollers are built up so that the structural member is confined in all directions between the forming rollers, and thus an unusual form such as shown can be rolled into a true circle.

Figure 16:
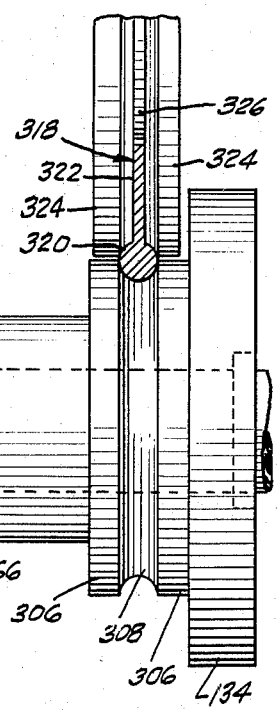
Fig. 16 is a similar cross-sectional view showing the die rollers as assembled and mounted for forming a circle from a further type of irregular shape.

In Fig. 16 I have shown a structural element 318 which is formed with a circular edge portion 320 and a medially disposed ledge 322. Each of the bottom roller dies for receiving this particular strip may be built up in the same way as the roller die shown in Fig. 16, with the members 306 and 308 fastened on the shaft by the spacer 166 and nut 130. The upper roller die may comprise a pair of roller discs 324 formed at their outer edge to conform to the shape of the spherical edge 320 of the strip, and separated the width of the inturned ledge of the same by a spacer 326.

From the illustrations of the various ways in which the die forming rollers can be built up, it can be seen that within limits any preferred configuration of strip can be rolled into a circle or into an arc. For example, angle irons can be rolled in four ways, "leg-in," "leg-out," and toe-in and toe-out. Channels can be rolled in three ways—flanges in, flanges out, and flanges on edge. Strips may be rolled either flat or on edge. T-members may be rolled with the stem in, the stem out, or the T on edge, depending upon the construction of the die rollers.

In addition, as illustrated in Figs. 15 and 16, various irregular or unusual types of structural members may be curved into an arc or a complete circle by the same method of operation, and that is by building the die rollers to conform to the inside and outside contour of the structural member. In all instances it is desirable that the cross-sectional web of the structural member be confined from all directions so that the possibility of deformation or distortion is completely eliminated.

In Fig. 17 I have shown a modified mounting for the shaft members 24, 30 and 32, which may include the roller bearing assembly 140 mounted adjacent the peripheral edge of the backing plate 134. I form the shafts above described with an enlarged shoulder 32a and provide an elongated cylindrical roller bearing unit 186 with the inner race 188 mounted on the shoulder 32a and the outer race 190 mounted in the bore 150 of the housing 10. A bearing of this type for the end of the shaft at which the forming rollers are mounted completely eliminates the possibility of any flexing or bending of the shaft during a working operation, even through unusually heavy structural members are being worked. Here again, the area where the pinching or bending is taking place is directly aligned with both radial and thrust bearings in the direction in which the force is transmitted, which completely obviates the possibility of making out-of-round bends as well as reducing the amount of power required in the forming operation.

The guide rolls 200 which are mounted on the edges of the front housing 10 are preferably made of hard rubber and mounted in suitable brackets 202 which are fastened on the tie bolts 16 in the space between the front and back walls of the front housing 10. For adjustment forward and back, I provide a bolt member 204 mounted in an arm 206 extending outwardly from each side of the front housing 10. The bolt 204 bears against a shoulder 208 on the bracket 202.

Figure 18:
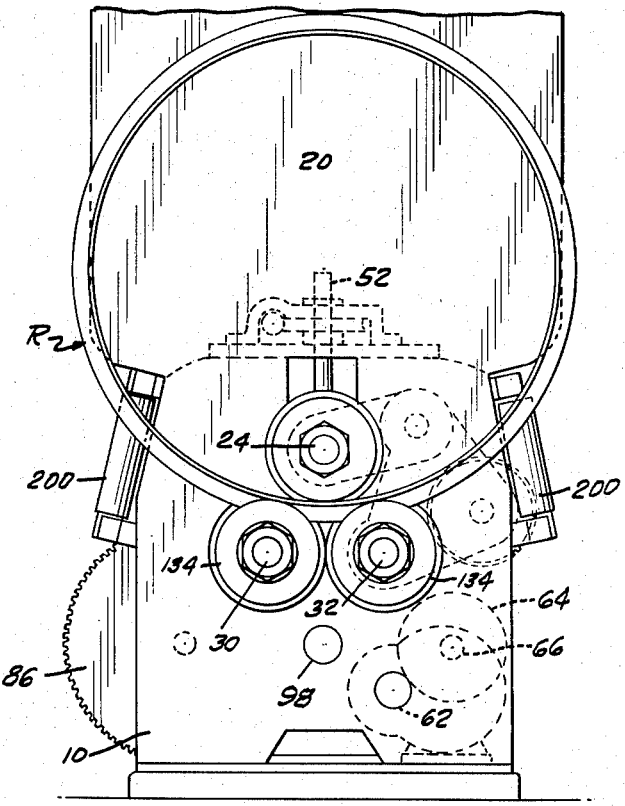
Fig. 18 is a front elevational view of the ring-forming machine showing a ring in the process of being formed.

In Fig. 18 I have shown the manner in which a comparatively large circular ring R may be formed in the present machine. As can be seen, the upper die roller 22 has been raised the desired distance to form a ring of the diameter desired, and in forming the circle the edges of the ring are guided by the side rollers 200 against the backing plate 20.

From the above and foregoing description it can be seen that I have provided a ring forming machine so engineered that the possibility of flexing of the die roller shafts during operation is completely eliminated, and this regardless of the strain that is placed upon the forming rollers during operation. Further, the construction of the bearing supports for the three roller shafts and the backing plates on the same is such that the direct thrust at the point of operation is absorbed by these bearings, their location being such that easy and efficient operation is obtained.

In addition, due to the detailed construction of the various elements of the forming rollers, each structural member that is worked is practically completely confined between the upper and lower forming rollers so there is no possibility of distortion or bending of any part thereof, and in each operation a true and complete forming action is accomplished.

I contemplate that changes and modifications may be made in the exact details shown and what I desire to secure and protect by United States Letters Patent is:

1. The combination with a cold roll structural iron member forming machine that has a vertically adjustable upper die roller and a right and left lower die roller disposed below said first mentioned roller on both sides of the same, a horizontal shaft for each of said die rollers, of a backing plate mounted on each shaft, each backing plate having a circular groove in the back face thereof generally adjacent the peripheral edge of the same, one of the rings of a thrust bearing secured in said groove, the other ring secured in the frame of said structural member adjacent said backing plate, a ball bearing in said frame for supporting said shaft therein, a circular ring positioned between the holder for said ball bearing and the backing ring of said thrust bearing, each shaft having a key-way and key therein and a build-up die roller mounted on each of said lower shafts, said die rollers spaced from the backing plate the width of the web of the structural member to be formed into a spiral shape, and said upper roll having a conforming die roller spaced from the lower die rollers the width of an extended portion of the structural member to confine the same therebetween.

2. The combination with a cold roll structural iron member forming machine that has a vertically adjustable upper die roller and a right and left lower die roller disposed below said first mentioned roller on both sides of the same, a horizontal shaft for each of said die rollers, of a backing plate mounted on each shaft, each backing plate having a circular groove in the back face thereof generally adjacent the peripheral edge of the same, one of the rings of a thrust bearing secured in said groove, the other ring secured in the frame of said structural member adjacent said backing plate, a ball bearing in said frame for supporting said shaft therein, a circular ring positioned between the holder for said ball bearing and the backing ring of said thrust bearing, and a built-up die roller mounted on each of said lower shafts.

3. The combination with a cold roll structural iron member forming machine that has a vertically adjustable upper die roller and a right and left lower die roller disposed below said first mentioned roller on both sides of the same, a horizontal shaft for each of said die rollers, of a backing plate mounted on each shaft, each backing plate having a circular groove in the back face thereof generally adjacent the peripheral edge of the same, one of the rings of a thrust bearing secured in said groove, the other ring secured in the frame of said structural member adjacent said backing plate, and a built-up die roller mounted on each of said lower shafts.

References Cited in the file of this patent

UNITED STATES PATENTS

| Number | Name | Date |
|---|---|---|
| 82,919 | Cambensy | Oct. 13, 1868 |
| 168,450 | Campbell | Oct. 5, 1875 |
| 529,536 | Sotter | Nov. 20, 1894 |
| 585,214 | Kling | June 29, 1897 |
| 589,167 | Doolittle | Aug. 31, 1897 |
| 635,433 | Einfeldt | Oct. 24, 1899 |
| 719,304 | Coghlin | Jan. 27, 1903 |
| 774,108 | Richardson | Nov. 1, 1904 |
| 1,009,586 | Schmidt | Nov. 21, 1911 |
| 1,022,307 | Eberhart | Apr. 2, 1912 |
| 1,094,312 | Delmez | Apr. 21, 1914 |
| 1,144,459 | Burman | June 29, 1915 |
| 1,203,306 | Brinkman | Oct. 31, 1916 |
| 1,252,115 | Hughes | Jan. 1, 1918 |
| 1,338,946 | Meyers | May 4, 1920 |
| 1,868,341 | Yates | July 19, 1932 |
| 1,915,312 | Hauf | June 27, 1933 |
| 1,963,661 | Kane | June 19, 1934 |
| 2,160,216 | Kane | May 30, 1939 |
| 2,352,816 | Weightman | July 4, 1944 |
| 2,365,882 | Kane | Dec. 26, 1944 |
| 2,437,500 | Bruegger | Mar. 9, 1948 |
| 2,699,695 | Addison | Jan. 18, 1955 |

FOREIGN PATENTS

| Number | Country | Date |
|---|---|---|
| 278,159 | Germany | Sept. 22, 1914 |
| 932,286 | Germany | Aug. 29, 1955 |